US011470481B2

(12) United States Patent
Hong et al.

(10) Patent No.: US 11,470,481 B2
(45) Date of Patent: Oct. 11, 2022

(54) APPARATUS AND METHOD USING A DECENTRALIZED GAME APPROACH FOR RADIO AND COMPUTING RESOURCE ALLOCATION IN CO-LOCATED EDGE COMPUTING

(71) Applicant: UNIVERSITY-INDUSTRY COOPERATION GROUP OF KYUNG HEE UNIVERSITY, Yongin-si (KR)

(72) Inventors: Choong Seon Hong, Yongin-si (KR); Zaw Chit Wutyee, Suwon-si (KR); Han Yeo Reum Im, Seoul (KR)

(73) Assignee: UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 0 days.

(21) Appl. No.: 17/006,009

(22) Filed: Aug. 28, 2020

(65) Prior Publication Data

US 2021/0160699 A1    May 27, 2021

(30) Foreign Application Priority Data

Nov. 25, 2019   (KR) .................. 10-2019-0152552
Aug. 28, 2020   (KR) .................. 10-2020-0109439

(51) Int. Cl.
  *H04W 72/04*   (2009.01)
  *H04W 16/14*   (2009.01)
  *H04W 72/06*   (2009.01)

(52) U.S. Cl.
  CPC ....... *H04W 16/14* (2013.01); *H04W 72/0493* (2013.01); *H04W 72/06* (2013.01)

(58) Field of Classification Search
  CPC . H04W 16/14; H04W 72/0493; H04W 72/06; H04W 16/18
  See application file for complete search history.

(56) References Cited

FOREIGN PATENT DOCUMENTS

| CN | 105933969 A | * | 9/2016 | |
|---|---|---|---|---|
| EP | 2477435 A1 | * | 7/2012 | ............ H04W 24/02 |
| KR | 10-1262679 B1 | | 5/2013 | |

(Continued)

OTHER PUBLICATIONS

Guan et al., "Distributed Resource Management for Cognitive Ad Hoc Networks With Cooperative Relays," IEEE/ACM Transactions on Networking, vol. 24, No. 3, pp. 1675-1689, Jun. 2016 (Year: 2016).*

(Continued)

*Primary Examiner* — Un C Cho
*Assistant Examiner* — Lalita W Pace
(74) *Attorney, Agent, or Firm* — Sughrue Mion, PLLC (57) ABSTRACT

The present disclosure relates to a technical idea for managing radio and computing resources in coexistence edge computing. A method of allocating radio and computing resources in coexistence edge computing according to one embodiment may include a step of formulating a resource allocation problem for two different entities with conflicting relationships in minimizing latency as a generalized Nash equilibrium problem (GNEP), a step of converting the formulated GNEP into a Nash equilibrium problem (NEP), and a step of allocating resources on a penalty basis for the converted NEP.

7 Claims, 4 Drawing Sheets

(56) References Cited

FOREIGN PATENT DOCUMENTS

| KR | 10-2018-0112825 A | 10/2018 |
| KR | 10-2018-0119162 A | 11/2018 |

OTHER PUBLICATIONS

Ardagna et al., "Generalized Nash Equilibria for the Service Provisioning Problem in Multi-Cloud Systems," IEEE Transactions on Services Computing, vol. 10, No. 3, pp. 381-395, May 1-Jun. 2017 (Year: 2017).*

Lan et al., "A Hierarchical Game for Joint Wireless and Cloud Resource Allocation in Mobile Edge Computing System," 2018 10th International Conference on Wireless Communications and Signal Processing (WCSP), pp. 1-7, 2018 (Year: 2018).*

Liu et al., "Generalized Nash Equilibrium Model of the Service Provisioning Problem in Multi-cloud Competitions," 2018 IEEE Smartworld, pp. 1485-1490, 2018 (Year: 2018).*

Moura et al., "Survey of game theory and future trends with application to emerging wireless data communication networks," Researchgate.net/publication 315764798, pp. 1-69, 2017 (Year: 2017).*

Jiang et al., "VRAA: Virtualized resource auction and allocation based on incentive and penalty," Cluster Computing, 2013, pp. 639-650 (Year: 2013).*

Wang et al., "Distributed Optimization of Hierarchical Small Cell Networks: a GNEP Framework," IEEE Journal on Selected Areas in Communications, vol. 35, No. 2, Feb. 2017, pp. 249-264 (Year: 2017).*

Yu et al., Optimal Resource Sharing in 5G-Enabled Vehicular Networks: A Matrix Game Approach, IEEE Transactions on Vehicular Technology, vol. 65, No. 10, Oct. 2016, pp. 7844-7856 (Year: 2016).*

Lee et al., "Recent Advances in Radio Resource Management for LTE/LTE-A Networks," IEEE Communications Surveys & Tutorials, vol. 16, No. 4, Fourth Quarter 2014, pp. 2142-2178. (Year: 2014).*

Danilo Ardagna et al., "Generalized Nash Equilibria for the Service Provisioning Problem in Cloud Systems", IEEE Transactions on Services Computing, vol. 6, No. 4, Oct.-Dec. 2013, pp. 429-442.

Francisco Facchinei et al., "Penalty Methods for the Solution of Generalized Nash Equilibrium Problems", Society for Industrial and Applied Mathematics J. Optim., vol. 20, No. 5, pp. 2228-2253.

Communication dated Nov. 10, 2021, issued by the Korean Patent Office in counterpart Korean Application No. 10-2020-0109439.

Communication dated Apr. 18, 2022, issued in Korean Application No. 10-2020-0109439.

* cited by examiner

APPARATUS AND METHOD USING A DECENTRALIZED GAME APPROACH FOR RADIO AND COMPUTING RESOURCE ALLOCATION IN CO-LOCATED EDGE COMPUTING

CROSS-REFERENCE TO RELATED APPLICATION

This application claims priority to Korean Patent Application No. 10-2019-0152552, filed on Nov. 25, 2019, and Korean Patent Application No. 10-2020-0109439, filed on Aug. 28, 2020, in the Korean Intellectual Property Office, the disclosures of each of which are incorporated herein by reference.

BACKGROUND OF THE DISCLOSURE

Field of the Disclosure

The present disclosure relates to a technical idea for managing radio and computing resources in coexistence edge computing. More particularly, the present disclosure relates to a technical idea for efficiently managing radio and computing resources owned by two different entities, a mobile network operator (MNO) and a computing resource provider (CRP), in a novel business model described as co-located mobile edge computing.

Description of the Related Art

Tower sharing between mobile network operators (MNOs) is a common approach method in which physical infrastructure distributed by other tower providers is shared by MNOs. Through this tower sharing, capital expenditure may be reduced, and a service range may be expanded, thereby satisfying user requirements.

Wireless network virtualization facilitates sharing of radio resources (active infrastructure) and physical apparatuses (passive infrastructure) among several mobile virtual network operators.

In addition, computing resource providers (CRPs) such as IBM and Vapor, by placing servers in towers through cooperation with tower providers, can provide low-latency applications, such as virtual reality and augmented reality, to users in real time.

Recently, resource allocation has received attention as an important topic in multi-access edge computing (MEC).

Energy-efficient radio resource allocation and offloading in a single-cell environment in which computing resource allocation in an edge server is not considered have been proposed.

Technology of providing dynamic task offloading and a scheduling IoT service in MEC takes into account continuous upload delay. Here, downlink radio resource allocation is also ignored. Most previous work ignored the queue model in latency calculation. However, according to the related art, a queue network for providing energy-efficient resources by expanding the CPU resources of a server without considering radio resource allocation has been proposed.

Another queuing model of MEC takes into account latency and reliability-recognition task offload by controlling user's transmission capability and the CPU cycles of an MEC server.

Radio transmission and cloud execution are modeled as Poisson processes in a technique that takes into account the upper delay limit.

A generalized Nash equilibrium problem (GNEP) has been considered an important approach in solving a resource allocation problem. Formulation of service provision in a multi-cloud environment using a GNEP can be confirmed in the related art.

According to the related art, a GNEP-based algorithm for solving offloading decision by scheduling users in MEC has been proposed.

To efficiently solve a GNEP, penalty-based algorithms have been studied in the related art.

Offloading of a job with an MEC server requires the radio resources and computing resources of an MNO for transmitting and receiving the data of a CRP to process the job.

To solve the difficulty of causing resource allocation problems due to strong coupling between providers, to formulate a resource allocation problem as a GNEP and solve the formalized GNEP, a penalty-based algorithm is needed.

RELATED ART DOCUMENTS

Patent Documents

Korean Patent Application Publication No. 10-2018-0119162 "PLATFORM FOR COMPUTING AT MOBILE EDGE"

Korean Patent Application Publication No. 10-2018-0112825 "METHOD AND SERVER FOR CONTROLLING RELOCATION OF MEC APPLICATIONS"

SUMMARY OF THE DISCLOSURE

Therefore, the present disclosure has been made in view of the above problems, and it is an object of the present disclosure to efficiently manage radio and computing resources owned by two different entities, a mobile network operator (MNO) and a computing resource provider (CRP), in a novel business model.

In accordance with one aspect of the present disclosure, provided is a method of allocating radio and computing resources in coexistence edge computing, the method including formulating a resource allocation problem for two different entities with conflicting relationships in minimizing latency as a generalized Nash equilibrium problem (GNEP); converting the formulated GNEP into a Nash equilibrium problem (NEP); and allocating resources on a penalty basis for the converted NEP.

According to one embodiment, the two different entities may be a mobile network operator (MNO) and a computing resource provider (CRP), and the formulating may include formulating the resource allocation problem as the GNEP considering a connection relationship between radio resource allocation of the MNO and computing resource allocation of the CRP.

According to one embodiment, the allocating may include selecting an initial penalty parameter and resource allocation by the two different entities; solving each predefined self-optimization problem according to the selected initial penalty parameter and resource allocation; determining whether the self-optimization problem has been solved; and searching for a GNE for terminating an algorithm when determining that the self-optimization problem has been solved based on the determination result, or updating an initial penalty parameter when determining that the self-optimization problem has not been solved based on the determination result.

According to one embodiment, the determining of whether the self-optimization problem has been solved may include determining whether a coupling constraint for resource allocation has been satisfied in relation to the self-optimization problem to determine whether the self-optimization problem has been solved.

According to one embodiment, one of the two different entities may be a computing resource provider (CRP), and an optimization problem for the CRP among the self-optimization problems may be defined by Equation 1 below:

[Equation 1]

$$\min_{m \in S_0} \Theta_{CRP}(m, W^{ul}, W^{dl}) + \sum_{j=1}^{J} \kappa_0^{BS_j} f_j(W_j^{dl}, m_j) +$$

$$\kappa_0^{mec} g(W^{ul}, m) \text{ where } \Theta_{CRP}(m, W^{ul}, W^{dl}) =$$

$$\sum_{j=1}^{J} \sum_{u \in \mathcal{U}_j} t_u^{ul} + t_u^p + t_u^{dl}, f_j(W_j^{dl}, m_j) =$$

$$\frac{\sum_{u \in \mathcal{U}_j} \frac{m_u \hat{m}}{c_u}}{\sum_{u \in \mathcal{U}_j} \frac{\omega_u^{dl} \gamma_u^{dl}}{o_u}} \cdot g(W^{ul}, m) =$$

$$\frac{\sum_{j=1}^{J} \sum_{u \in \mathcal{U}_j} \frac{\omega_u^{ul} \gamma_u^{ul}}{b_u}}{\sum_{j=1}^{J} \sum_{u \in \mathcal{U}_j} \frac{m_u \hat{m}}{c_u}} - 1 + \epsilon \text{ and } S_0 = \left\{ m \left| \sum_{j=1}^{J} \sum_{u \in \mathcal{U}_j} m_u \leq 1 \right. \right\}$$

$$t_u^{ul} = \frac{b_u}{\omega_u^{ul} \gamma_u^{ul} [1 - v_u]} \text{ where } v_u = \frac{\lambda_u b_u}{\omega_u^{ul} \gamma_u^{ul}}$$

$$t_u^p = \frac{c_u}{m_u \hat{m} [1 - \psi]} \text{ where } \psi = \frac{\sum_{j=1}^{J} \sum_{u \in \mathcal{U}_j} \frac{\omega_u^{ul} \gamma_u^{ul}}{b_u}}{\sum_{j=1}^{J} \sum_{u \in \mathcal{U}_j} \frac{m_u \hat{m}}{c_u}}$$

$$t_u^p = \frac{o_u}{\omega_u^{dl} \gamma_u^{dl} [1 - \rho_j]} \text{ where } \rho_j = \frac{\sum_{u \in \mathcal{U}_j} \frac{m_u \hat{m}}{\varepsilon_u}}{\sum_{u \in \mathcal{U}_j} \frac{\omega_u^{dl} \gamma_u^{dl}}{o_u}}$$

According to one embodiment, one of the two different entities may be a mobile network operator (MNO), and an optimization problem for the MNO among the self-optimization problems may be defined by Equation 2 below:

[Equation 2]

$$\min_{w_j^{ul}, w_j^{dl} \in S_j} \Theta_{MNO_j}(m, W^{ul}, W_j^{dl}) +$$

$$\kappa_j^{BS_j} f_j(W_j^{dl}, m_j) + \kappa_j^{mec} g(W^{ul}, m)$$

where $\Theta_{BS_j} = \sum_{u \in \mathcal{U}_j} t_u^{ul} + t_u^p + t_u^{dl}$ and $$S_j = \left\{ (W_j^{ul}, W_j^{dl}) \left| \sum_{u \in \mathcal{U}_j} \omega_u^{ul} \leq 1, \right. \right.$$

-continued $$\left. \sum_{u \in \mathcal{U}_j} \omega_u^{dl} \leq 1, W_j^{ul} \geq \left[ \frac{\lambda_u b_u}{\gamma_u^{ul}(1 - \epsilon)} \right]_{u \in \mathcal{U}_j}^T \right\}$$

$$t_u^{ul} = \frac{b_u}{\omega_u^{ul} \gamma_u^{ul} [1 - v_u]} \text{ where } v_u = \frac{\lambda_u b_u}{\omega_u^{ul} \gamma_u^{ul}}$$

$$t_u^p = \frac{c_u}{m_u \hat{m} [1 - \psi]} \text{ where } \psi = \frac{\sum_{j=1}^{J} \sum_{u \in \mathcal{U}_j} \frac{\omega_u^{ul} \gamma_u^{ul}}{b_u}}{\sum_{j=1}^{J} \sum_{u \in \mathcal{U}_j} \frac{m_u \hat{m}}{c_u}}$$

$$t_u^p = \frac{o_u}{\omega_u^{dl} \gamma_u^{dl} [1 - \rho_j]} \text{ where } \rho_j = \frac{\sum_{u \in \mathcal{U}_j} \frac{m_u \hat{m}}{c_u}}{\sum_{u \in \mathcal{U}_j} \frac{\omega_u^{dl} \gamma_u^{dl}}{o_u}}$$

According to one embodiment, the processor may formulate, as a generalized Nash equilibrium problem (GNEP), a resource allocation problem for two different entities, a mobile network operator (MNO) and a computing resource provider (CRP), with conflicting relationships in minimizing latency, wherein the processor formulates the resource allocation problem as the GNEP in consideration of a connection relationship between radio resource allocation of the MNO and computing resource allocation of the CRP; the process may convert the formulated GNEP into a Nash equilibrium problem (NEP); and the process may allocate resources on a penalty basis for the converted NEP.

According to one embodiment, to allocate resources on the penalty basis, the processor may receive an initial penalty parameter and resource allocation selected by the two different entities, may solve each predefined self-optimization problem according to the selected initial penalty parameter and resource allocation, may determine whether the self-optimization problem has been solved, may search for a GNE for terminating an algorithm when determining that the self-optimization problem has been solved based on the determination result, and may update an initial penalty parameter when determining that the self-optimization problem has not been solved based on the determination result.

According to one embodiment, to determine whether the self-optimization problem has been solved, the processor may determine whether a coupling constraint for resource allocation has been satisfied in relation to the self-optimization problem to determine whether the self-optimization problem has been solved.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE DISCLOSURE

Specific structural and functional descriptions of embodiments according to the concept of the present disclosure disclosed herein are merely illustrative for the purpose of explaining the embodiments according to the concept of the present disclosure. Furthermore, the embodiments according to the concept of the present disclosure can be implemented in various forms and the present disclosure is not limited to the embodiments described herein.

The embodiments according to the concept of the present disclosure may be implemented in various forms as various modifications may be made. The embodiments will be described in detail herein with reference to the drawings. However, it should be understood that the present disclosure is not limited to the embodiments according to the concept of the present disclosure, but includes changes, equivalents, or alternatives falling within the spirit and scope of the present disclosure.

The terms such as "first" and "second" are used herein merely to describe a variety of constituent elements, but the constituent elements are not limited by the terms. The terms are used only for the purpose of distinguishing one constituent element from another constituent element. For example, a first element may be termed a second element and a second element may be termed a first element without departing from the teachings of the present disclosure.

It should be understood that when an element is referred to as being "connected to" or "coupled to" another element, the element may be directly connected or coupled to the other element or intervening elements may be present. In contrast, when an element is referred to as being "directly connected to" or "directly coupled to" another element, there are no intervening elements present. Other words used to describe the relationship between elements or layers should be interpreted in a like fashion (e.g., "between," versus "directly between," "adjacent," versus "directly adjacent," etc.).

The terms used in the present specification are used to explain a specific exemplary embodiment and not to limit the present inventive concept. Thus, the expression of singularity in the present specification includes the expression of plurality unless clearly specified otherwise in context. Also, terms such as "include" or "comprise" should be construed as denoting that a certain characteristic, number, step, operation, constituent element, component or a combination thereof exists and not as excluding the existence of or a possibility of an addition of one or more other characteristics, numbers, steps, operations, constituent elements, components or combinations thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments of the present disclosure will be described in detail with reference to the accompanying drawings. However, the scope of the present disclosure is not limited by these embodiments. Like reference numerals in the drawings denote like elements.

Figure 1:
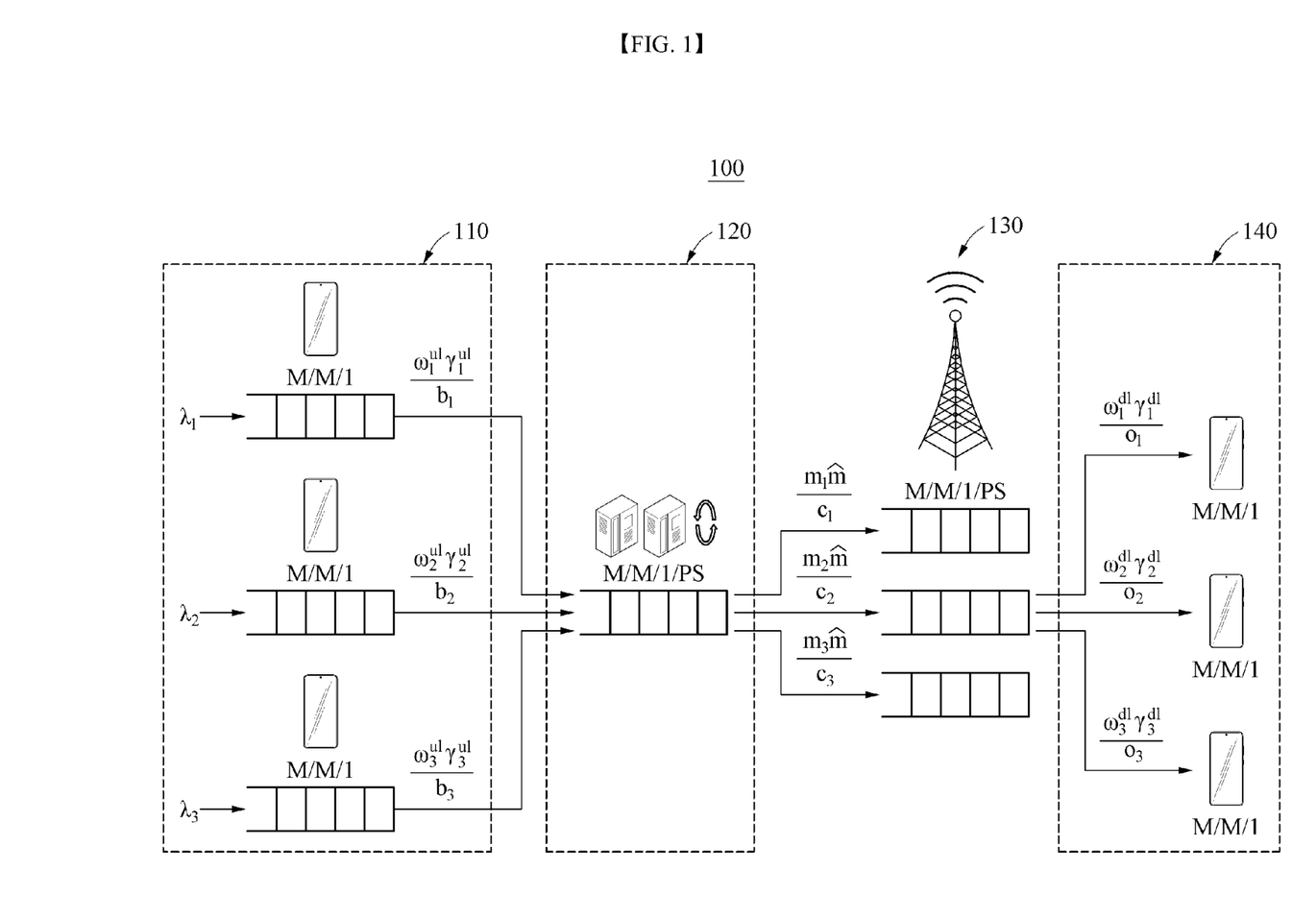
FIG. 1 is a drawing for explaining a system model according to one embodiment.

FIG. 1 is a drawing for explaining a system model 100 according to one embodiment.

The system model 100 according to one embodiment may be molded using a Poisson process that takes into account the upper delay limit in radio transmission and cloud execution.

Since a generalized Nash equilibrium problem (GNEP) captures coupling between two players, the GNEP may be a prominent approach to solve resource allocation problems. Formulation of service provision in a multi-cloud environment using the GNEP may be confirmed in the system model 100 according to one embodiment.

In the system model 100 according to one embodiment, a GNEP-based algorithm may be used to reserve a user to resolve offloading decision. For this purpose, a GNEP and a solution approach may be discussed, and a penalty-based algorithm may be studied to efficiently solve the GNEP.

To offload tasks to an MEC server, the radio resource of an MNO for transmitting and receiving data and the computing resource of a CRP for treating tasks are required. Such strong coupling between providers may make a resource allocation problem difficult, but the system model 100 according to one embodiment formulates a resource allocation problem as a GNEP and operates as a penalty-based algorithm for solving the formulated GNEP.

The system model 100 according to one embodiment may represent a system model of a co-located mobile edge computing system.

For this purpose, reference number 110 denotes a plurality of mobile network operators (MNOs), and reference number 120 denotes a computing resource provider (CRP).

According to the system model 100, a mobile network operator (MNO) and a computing resource provider (CRP) may be placed in the same tower station 130.

The MNO of the system model 100 owns a radio resource and a physical apparatus that are required to transmit and receive radio signals.

However, a space of the tower station 130 and other facilities, such as cooling facilities and electrical facilities, of a tower provider may be leased. The CRP leases a space and facilities from the tower provider and distributes servers to a tower.

When a user offloads tasks to an MEC server, i.e., to use services provided by a CRP, radio resources managed by an MNO and computing resources owned by a CRP are required. This offloading requires three steps: an upload step, a computing step, and a download step. In this case, each step may be modeled as a queue.

User u may create a task of speed $\lambda_u$ that follows a homogeneous Poisson process. In addition, the input file size of this task follows an exponential distribution having mean $b_u$.

That is, the service speed of an uplink queue, which is a user queue, is $$\frac{\omega_u^{ul}\gamma_u^{ul}}{b_u},$$

which is the data rate of uplink transmission divided by an input file size.

Offloaded tasks arrive at an MEC server pool at a rate of $$\sum_u \frac{m_u \hat{m}}{c_u},$$

which is a sum of the service rates of all user queues. The essential CPU cycles of these tasks follow an exponential distribution using mean cu.

The MEC server pool calculates this as in a processor sharing approach. The service speed of the MEC server pool is $$\sum_{u \in \mathcal{U}_j} \frac{m_u \hat{m}}{c_u}$$

divided by CPU cycles required by CPU cycles per second.

After the MEC server pool calculates user's tasks, the result arrives at the base station of a corresponding MNO at a rate of $$\sum_{u \in \mathcal{U}_j} \frac{m_u \hat{m}}{c_u}.$$

This result follows an exponential distribution with mean $o_u$. The corresponding base station j transmits the result back to the user at a rate of $$\sum_{u \in \mathcal{U}_j} \frac{\omega_u^{fl} \gamma_u^{dl}}{o_u},$$

which is the data rate of downlink transmission divided by a result file size.

Figure 2:
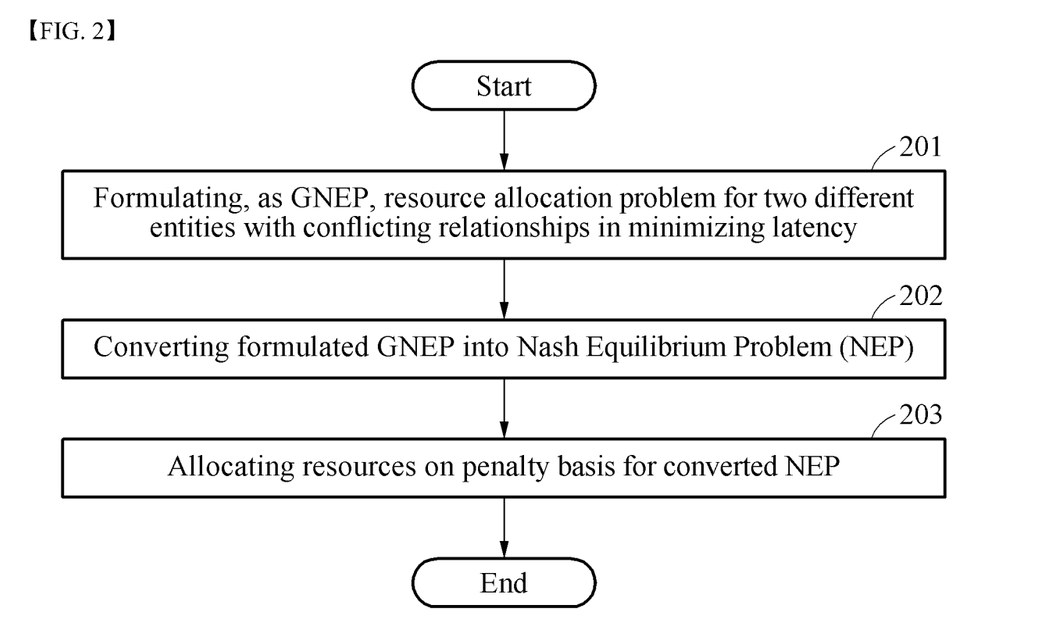
FIG. 2 is a flowchart for explaining a method of allocating radio and computing resources in coexistence edge computing according to one embodiment.

FIG. 2 is a flowchart for explaining a method of allocating radio and computing resources in coexistence edge computing according to one embodiment.

In the method of allocating radio and computing resources in coexistence edge computing according to one embodiment, a resource allocation problem for two different entities with conflicting relationships in minimizing latency may be formulated as a generalized Nash equilibrium problem (GNEP) (step 201).

For example, two different entities may be interpreted as a mobile network operator (MNO) and a computing resource provider (CRP).

In this case, for formulation into the GNEP, the resource allocation problem may be formulated as the GNEP considering the connection relationship between radio resource allocation of an MNO and computing resource allocation of a CRP.

In addition, in the method of allocating radio and computing resources in coexistence edge computing according to one embodiment, the formulated GNEP may be converted into a Nash equilibrium problem (NEP) (step 202).

In addition, in the method of allocating radio and computing resources in coexistence edge computing according to one embodiment, resources may be allocated on a penalty basis for the converted NEP (step 203).

A method of allocating resources on a penalty basis will be described in detail with reference to FIG. 3.

Figure 3:
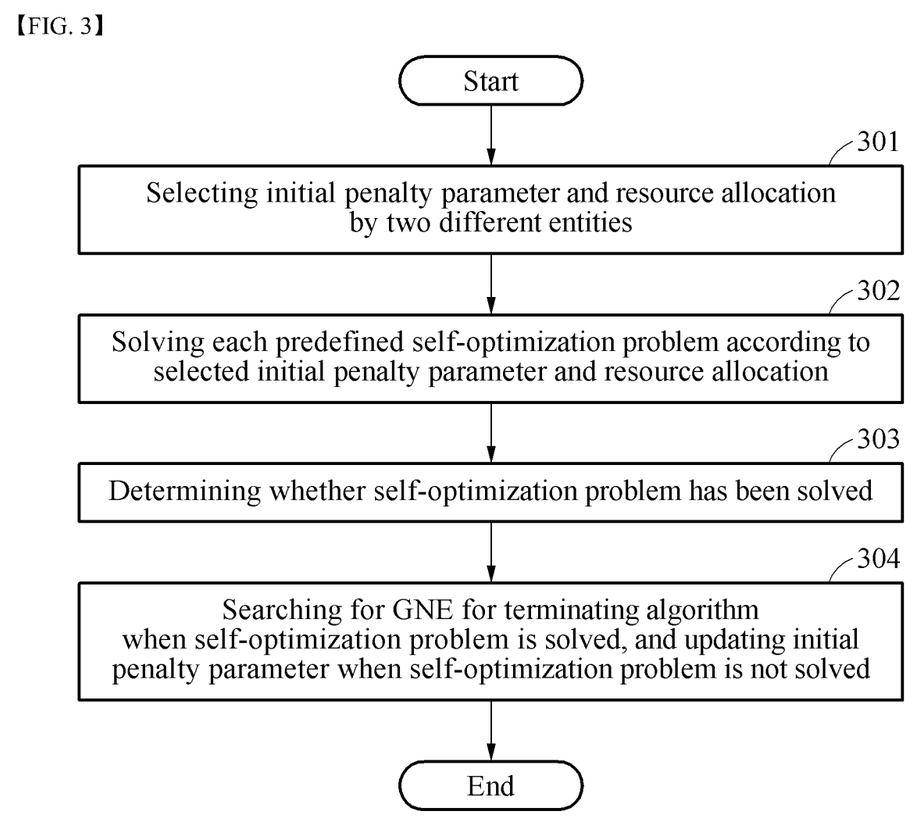
FIG. 3 is a flowchart for explaining a method of allocating resources on a penalty basis according to one embodiment.

FIG. 3 is a flowchart for explaining a method of allocating resources on a penalty basis according to one embodiment.

In the method of allocating resources on a penalty basis according to one embodiment, to allocate resources on a penalty basis, an initial penalty parameter and resource allocation may be selected by two different entities (step 301).

Next, in the method of allocating resources on a penalty basis according to one embodiment, each predefined self-optimization problem may be solved according to the selected initial penalty parameter and resource allocation (step 302).

In addition, in the method of allocating resources on a penalty basis according to one embodiment, it is possible to determine whether the self-optimization problem has been solved (step 303).

For example, to determine whether the self-optimization problem has been solved, in relation to the self-optimization problem, by determining whether a coupling constraint for resource allocation has been satisfied, it is possible to determine whether the self-optimization problem has been solved.

Specifically, an optimization problem for the CRP of the self-optimization problems used in the method of allocating resources on a penalty basis according to one embodiment may be defined by Equation 1 below:

$$\min_{m \in \mathcal{S}_0} \Theta_{CRP}(m, W^{ul}, W^{dl}) + \sum_{j=1}^{J} \kappa_0^{BS_j} f_j(W_j^{dl}, m_j) + \kappa_0^{mec} g(W^{ul}, m) \quad \text{[Equation 1]}$$

where $\Theta_{CRP}(m, W^{ul}, W^{dl}) = \sum_{j=1}^{J} \sum_{u \in \mathcal{U}_j} t_u^{ul} + t_u^p + t_u^{dl}$, $$f_j(W_j^{dl}, m_j) = \frac{\sum_{u \in \mathcal{U}_j} \frac{m_u \hat{m}}{c_u}}{\sum_{u \in \mathcal{U}_j} \frac{\omega_u^{dl} \gamma_u^{dl}}{o_u}},$$

$$g(W^{ul}, m) =$$

$$\frac{\sum_{j=1}^{J} \sum_{u \in \mathcal{U}_j} \frac{\omega_u^{ul} \gamma_u^{ul}}{b_u}}{\sum_{j=1}^{J} \sum_{u \in \mathcal{U}_j} \frac{m_u \hat{m}}{c_u}} - 1 + \epsilon \text{ and } \mathcal{S}_0 = \left\{ m \middle| \sum_{j=1}^{J} \sum_{u \in \mathcal{U}_j} m_u \le 1 \right\}$$

In Equation 1, the components of a delay function may be calculated as follows:

$$t_u^{ul} = \frac{b_u}{\omega_u^{ul} \gamma_u^{ul} [1 - \upsilon_u]} \text{ where } \upsilon_u = \frac{\lambda_u b_u}{\omega_u^{ul} \gamma_u^{ul}}$$

$$t_u^p = \frac{c_u}{m_u \hat{m} [1 - \psi]} \text{ where } \psi = \frac{\sum_{j=1}^{J} \sum_{u \in \mathcal{U}_j} \frac{\omega_u^{ul} \gamma_u^{ul}}{b_u}}{\sum_{j=1}^{J} \sum_{u \in \mathcal{U}_j} \frac{m_u \hat{m}}{c_u}}$$

$$t_u^p = \frac{o_u}{\omega_u^{dl} \gamma_u^{dl} [1 - \rho_j]} \text{ where } \rho_j = \frac{\sum_{u \in \mathcal{U}_j} \frac{m_u \hat{m}}{c_u}}{\sum_{u \in \mathcal{U}_j} \frac{\omega_u^{dl} \gamma_u^{dl}}{o_u}}$$

In addition, in Equation 1, the meaning of each variable is as follows.

$\Theta_{CRP}$ represents the objective function of a CRP, which is the end-to-end delay time of all users.

$W^{ul}$ represents an uplink resource allocation vector.

$BS_j$ represents base station j.

$g(W^{ul}, m)$ represents the stability of a computing resource queue related to uplink and computing resource allocation.

$S_0$ represents the strategy of a CRP to determine the limit of the computing resource of the CRP.

p may represent the index of a player, wherein a CRP is 0 and an MNO is 1, . . . , N.

An optimization problem for an MNO of self-optimization problems used in the method of allocating resources on a penalty basis according to one embodiment may be defined by Equation 2 below.

An optimization problem for the MNO among the self-optimization problems may be defined by Equation 2 below:

$$\min_{w_j^{ul}, w_j^{dl} \in S_j} \Theta_{MNO_j}(m, W^{ul}, W_j^{dl}) +$$ [Equation 2]

$$\kappa_j^{BS_j} f_j(W_j^{dl}, m_j) + \kappa_j^{mec} g(W^{ul}, m)$$

where $\Theta_{BS_j} = \sum_{u \in \mathcal{U}_j} t_u^{ul} + t_u^p + t_u^{dl}$ and $$S_j = \left\{ (W_j^{ul}, W_j^{dl}) \middle| \sum_{u \in \mathcal{U}_j} \omega_u^{ul} \leq 1, \right.$$

$$\left. \sum_{u \in \mathcal{U}_j} \omega_u^{dl} \leq 1, W_j^{ul} \geq \left[ \frac{\lambda_u b_u}{\gamma_u^{ul}(1-\epsilon)} \right]_{u \in \mathcal{U}_j}^T \right\}$$

In Equation 2, the components of a delay function may be calculated as follows:

$$t_u^{ul} = \frac{b_u}{\omega_u^{ul} \gamma_u^{ul}[1-v_u]} \text{ where } v_u = \frac{\lambda_u b_u}{\omega_u^{ul} \gamma_u^{ul}}$$

$$t_u^p = \frac{c_u}{m_u \hat{m}[1-\psi]} \text{ where } \psi = \frac{\sum_{j=1}^J \sum_{u \in \mathcal{U}_j} \frac{\omega_u^{ul} \gamma_u^{ul}}{b_u}}{\sum_{j=1}^J \sum_{u \in \mathcal{U}_j} \frac{m_u \hat{m}}{c_u}}$$

$$t_u^p = \frac{o_u}{\omega_u^{dl} \gamma_u^{dl}[1-\rho_j]} \text{ where } \rho_j = \frac{\sum_{u \in \mathcal{U}_j} \frac{m_u \hat{m}}{c_u}}{\sum_{u \in \mathcal{U}_j} \frac{\omega_u^{dl} \gamma_u^{dl}}{o_u}}$$

p may represent the index of a player, wherein a CRP is 0 and an MNO is 1, . . . , N.

In the method of allocating resources on a penalty basis according to one embodiment, upon determining that the self-optimization problem has been solved based on the determination result, a step of searching for a GNE for terminating an algorithm may be performed, or upon determining that the self-optimization problem has not been solved based on the determination result, an initial penalty parameter may be updated (step 304).

Figure 4:
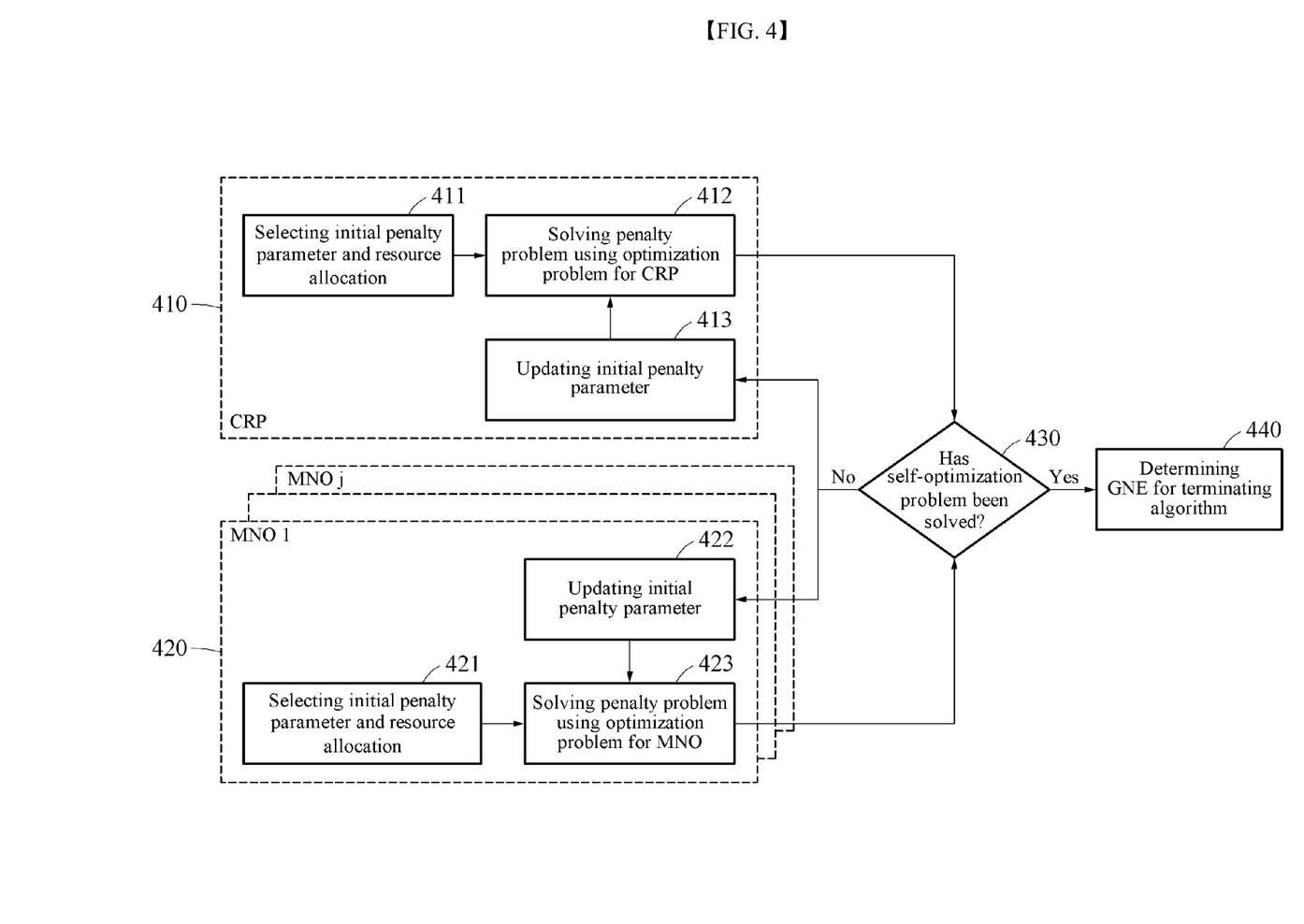
FIG. 4 is a flowchart for explaining an algorithm for allocating radio and computing resources in coexistence edge computing.

FIG. 4 is a flowchart for explaining an algorithm for allocating radio and computing resources in coexistence edge computing.

Each player, such as a CRP and an MNO, selects an initial penalty parameter and resource allocation. Based on the selected parameter, a self-optimization problem may be solved as defined in Equations 1 and 2.

When a coupling constraint for optimal resource allocation is satisfied, a GNE that terminates an algorithm is found. Otherwise, the player has to update a penalty parameter and solve an optimization problem until a coupling constraint condition is satisfied.

According to one embodiment of the present disclosure, resource allocation of mobile edge computing includes resource management for two different entities and multiple service providers with conflicting interests.

By efficiently managing radio and computing resources, minimum latency having conflicting interests between a mobile network operator and a computing resource provider is provided to a service.

As a commercialization example, a proposed method may be implemented for a novel business model of co-located mobile edge computing in which a mobile network operator is in charge of radio resource allocation and a computing resource provider controls computing resources.

The algorithm of FIG. 4 may be operated by a processor of an apparatus for allocating radio and computing resources, the processor working as at least one of a computer program, code, and an instruction.

In addition, the algorithm may be divided into an operation 410 in a CRP and an operation 420 in an MNO, and the operation 410 in the CRP and the operation 420 in the MNO may be independent of each other and may be processed independently.

For convenience of explanation, first looking at the operation in the CRP, the CRP may select an initial penalty parameter and resource allocation (411).

For example, the initial penalty parameter may be expressed as follows:

$\kappa_p^{BS_j, 0}, j=1, \ldots, N$ and $\kappa_p^{mec, 0}, p=0, \ldots, N$

In addition, initial points for resource allocation may be denoted by $m^k, W^{ul,k}, W^{dl,k}$.

Next, the CRP may solve a penalty problem using an optimization problem for the CRP (412).

For example, the optimization problem for the CRP may be defined through Equation 1 described above.

In addition, a processor may determine whether a self-optimization problem has been solved through an algorithm (430).

For this purpose, the processor may determine that the self-optimization problem has been solved when both conditions of Equation 3 are satisfied.

$f_j(W_j^{*,dl}, m_j^*) \leq 0, \forall j$ $g(W^{*,ul}, m^*) \leq 0$ [Equation 3]

In Equation 3, $f_j(W_j^{*,dl}, m_j^*)$ represents the stability of a downlink communication resource queue for optimal downlink and computing resource allocation, and $g(W^{*,ul}, m^*)$ represents the stability of a computing resource queue for optimal uplink and computing resource allocation.

As a result of determination of reference number 430, upon determining that the self-optimization problem has not been solved, an initial penalty parameter may be updated (413).

In addition, as a result of determination of reference number 430, upon determining that the self-optimization problem has been solved, a step of searching for a GNE for terminating an algorithm may be performed (440).

When Equation 3 is satisfied, the GNE may be determined as $[W^{*,ul}, m^*, W^{*,dl}]$.

Next, looking at operations in MNOs first, an initial penalty parameter and resource allocation may be selected by the MNO (421).

Next, MNOs may use optimization problems for the MNOs to solve penalty problems (422).

In addition, a processor may determine whether a self-optimization problem has been solved through an algorithm (430).

Upon determining that the self-optimization problem has not been solved based on the determination result of reference number 430, an initial penalty parameter may be updated (423).

Specifically, the CRP may update an initial penalty parameter as in Equation 4, and the MNO may update an initial penalty parameter as in Equation 5.

$$\kappa_p^{BS_j,k+1} = \begin{cases} \kappa_p^{BS_j,k} + \Delta_p^{BS_j,k}, & f_j(W_j^{*,dl}, m_j^*) > 0 \\ \kappa_p^{BS_j,k}, & f_j(W_j^{*,dl}, m_j^*) \le 0 \end{cases} \quad \text{[Equation 3]}$$

$$\kappa_p^{mec,k+1} = \begin{cases} k_p^{mec,k} + \Delta_p^{mec,k}, & g(W^{*,ul}, m^*) > 0 \\ k_p^{mec,k}, & g(W^{*,ul}, m^*) \le 0 \end{cases} \quad \text{[Equation 4]}$$

In addition, as a result of determination of reference number 430, upon determining that the self-optimization problem has been solved, a step of searching for a GNE for terminating an algorithm may be performed (440). In addition, when Equation 3 is satisfied, a GNE may be determined as $[W^{*,ul}, m^*, W^{*,dl}]$.

As a result, when the present disclosure is used, radio and computing resources owned by two different entities, a mobile network operator (MNO) and a computing resource provider (CRP), may be efficiently managed in a novel business model.

According to one embodiment, radio and computing resources owned by two different entities, a mobile network operator (MNO) and a computing resource provider (CRP), can be efficiently managed in a novel business model.

The apparatus described above may be implemented as a hardware component, a software component, and/or a combination of hardware components and software components. For example, the apparatus and components described in the embodiments may be achieved using one or more general purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and one or more software applications executing on the operating system. In addition, the processing device may access, store, manipulate, process, and generate data in response to execution of the software. For ease of understanding, the processing apparatus may be described as being used singly, but those skilled in the art will recognize that the processing apparatus may include a plurality of processing elements and/or a plurality of types of processing elements. For example, the processing apparatus may include a plurality of processors or one processor and one controller. Other processing configurations, such as a parallel processor, are also possible.

The software may include computer programs, code, instructions, or a combination of one or more of the foregoing, configure the processing apparatus to operate as desired, or command the processing apparatus, either independently or collectively. In order to be interpreted by a processing device or to provide instructions or data to a processing device, the software and/or data may be embodied permanently or temporarily in any type of a machine, a component, a physical device, a virtual device, a computer storage medium or device, or a transmission signal wave. The software may be distributed over a networked computer system and stored or executed in a distributed manner. The software and data may be stored in one or more computer-readable recording media.

The methods according to the embodiments of the present disclosure may be implemented in the form of a program command that can be executed through various computer means and recorded in a computer-readable medium. The computer-readable medium can store program commands, data files, data structures or combinations thereof. The program commands recorded in the medium may be specially designed and configured for the present disclosure or be known to those skilled in the field of computer software. Examples of a computer-readable recording medium include magnetic media such as hard disks, floppy disks and magnetic tapes, optical media such as CD-ROMs and DVDs, magneto-optical media such as floptical disks, or hardware devices such as ROMs, RAMs and flash memories, which are specially configured to store and execute program commands. Examples of the program commands include machine language code created by a compiler and high-level language code executable by a computer using an interpreter and the like. The hardware devices described above may be configured to operate as one or more software modules to perform the operations of the embodiments, and vice versa.

Although the present disclosure has been described with reference to limited embodiments and drawings, it should be understood by those skilled in the art that various changes and modifications may be made therein. For example, the described techniques may be performed in a different order than the described methods, and/or components of the described systems, structures, devices, circuits, etc., may be combined in a manner that is different from the described method, or appropriate results may be achieved even if replaced by other components or equivalents.

Therefore, other embodiments, other examples, and equivalents to the claims are within the scope of the following claims.

What is claimed is:

1. A method of allocating resources in coexistence edge computing, wherein the method uses a distributed game approach and comprises:
   selecting an initial penalty parameter and resource allocation by two different entities with conflicting relationships in minimizing latency;
   solving, by each of the two different entities, a predefined self-optimization problem according to the selected initial penalty parameter and resource allocation;
   determining, by each of the two different entities, whether a coupling constraint for resource allocation has been satisfied in relation to the self-optimization problem to determine whether the self-optimization problem has been solved; and
   searching, by each of the two different entities, for a generalized Nash equilibrium (GNE) for terminating an algorithm when determining that the self-optimization problem has been solved based on the determination result, or updating an initial penalty parameter when determining that the self-optimization problem has not been solved based on the determination result.

2. The method according to claim 1, wherein one of the two different entities is a computing resource provider (CRP), and the self-optimization problem for the CRP is defined by:

$$\min_{m \in S_0} \Theta_{CRP}(m, W^{ul}, W^{dl}) + \sum_{j=1}^{J} \kappa_0^{BS_j} f_j(W_j^{dl}, m_j) + \kappa_0^{mec} g(W^{ul}, m) \quad \text{[Equation 1]}$$

where $\Theta_{CRP}(m, W^{ul}, W^{dl}) = \sum_{j=1}^{J} \sum_{u \in \mathcal{U}_j} t_u^{ul} + t_u^p + t_u^{dl}$, $$f_j(W_j^{dl}, m_j) = \frac{\sum_{u \in \mathcal{U}_j} \frac{m_u \hat{m}}{c_u}}{\sum_{u \in \mathcal{U}_j} \frac{\omega_u^{dl} \gamma_u^{dl}}{o_u}},$$

$g(W^{ul}, m) =$ $$\frac{\sum_{j=1}^{J} \sum_{u \in \mathcal{U}_j} \frac{\omega_u^{ul} \gamma_u^{ul}}{b_u}}{\sum_{j=1}^{J} \sum_{u \in \mathcal{U}_j} \frac{m_u \hat{m}}{c_u}} - 1 + \epsilon \text{ and } S_0 = \left\{ m \, \middle| \, \sum_{j=1}^{J} \sum_{u \in \mathcal{U}_j} m_u \le 1 \right\}$$

$$t_u^{ul} = \frac{b_u}{\omega_u^{ul} \gamma_u^{ul} [1 - v_u]} \text{ where } v_u = \frac{\lambda_u b_u}{\omega_u^{ul} \gamma_u^{ul}}$$

$$t_u^p = \frac{c_u}{m_u \hat{m} [1 - \psi]} \text{ where } \psi = \frac{\sum_{j=1}^{J} \sum_{u \in \mathcal{U}_j} \frac{\omega_u^{ul} \gamma_u^{ul}}{b_u}}{\sum_{j=1}^{J} \sum_{u \in \mathcal{U}_j} \frac{m_u \hat{m}}{c_u}}$$

$$t_u^p = \frac{o_u}{\omega_u^{dl} \gamma_u^{dl} [1 - \rho_j]} \text{ where } \rho_j = \frac{\sum_{u \in \mathcal{U}_j} \frac{m_u \hat{m}}{c_u}}{\sum_{u \in \mathcal{U}_j} \frac{\omega_u^{dl} \gamma_u^{dl}}{o_u}}.$$

3. The method according to claim 1, wherein one of the two different entities is a mobile network operator (MNO), and the self-optimization problem for the MNO is defined by:

$$\min_{w_j^{ul}, w_j^{dl} \in S_j} \Theta_{MNO_j}(m, W^{ul}, W_j^{dl}) + \quad \text{[Equation 2]}$$

$$\kappa_j^{BS_j} f_j(W_j^{dl}, m_j) + \kappa_j^{mec} g(W^{ul}, m)$$

where $\Theta_{BS_j} = \sum_{u \in \mathcal{U}_j} t_u^{ul} + t_u^p + t_u^{dl}$ and $$S_j = \left\{ (W_j^{ul}, W_j^{dl}) \, \middle| \, \sum_{u \in \mathcal{U}_j} \omega_u^{ul} \le 1, \right.$$

$$\left. \sum_{u \in \mathcal{U}_j} \omega_u^{dl} \le 1, W_j^{ul} \ge \left[ \frac{\lambda_u b_u}{\gamma_u^{ul}(1 - \epsilon)} \right]_{u \in \mathcal{U}_j}^T \right\}$$

$$t_u^{ul} = \frac{b_u}{\omega_u^{ul} \gamma_u^{ul} [1 - v_u]} \text{ where } v_u = \frac{\lambda_u b_u}{\omega_u^{ul} \gamma_u^{ul}}$$

$$t_u^p = \frac{c_u}{m_u \hat{m} [1 - \psi]} \text{ where } \psi = \frac{\sum_{j=1}^{J} \sum_{u \in \mathcal{U}_j} \frac{\omega_u^{ul} \gamma_u^{ul}}{b_u}}{\sum_{j=1}^{J} \sum_{u \in \mathcal{U}_j} \frac{m_u \hat{m}}{c_u}}$$

$$t_u^p = \frac{o_u}{\omega_u^{dl} \gamma_u^{dl} [1 - \rho_j]} \text{ where } \rho_j = \frac{\sum_{u \in \mathcal{U}_j} \frac{m_u \hat{m}}{c_u}}{\sum_{u \in \mathcal{U}_j} \frac{\omega_u^{dl} \gamma_u^{dl}}{o_u}}.$$

4. The method according to claim 1, wherein the self-optimization problem is predefined using at least one of objective function which is an end-to-end delay time of all users, uplink resource allocation vector, stability of a computing resource queue related to uplink and computing resource allocation, strategy of a computing resource provider (CRP) to determine limit of a computing resource of the CRP, index of a player, wherein a CRP is 0 and a mobile network operator (MNO) is 1, ..., N.

5. A system comprising a first entity and a second entity, the first entity and the second entity each comprising a hardware processor that executes instructions that cause the hardware processor:

to select an initial penalty parameter and resource allocation, wherein the first entity and the second entity have conflicting relationships in minimizing latency, to solve a predefined self-optimization problem according to the selected initial penalty parameter and resource allocation, to determine whether a coupling constraint for resource allocation has been satisfied in relation to the self-optimization problem to determine whether the self-optimization problem has been solved, and to search for a generalized Nash equilibrium (GNE) for terminating an algorithm when determining that the self-optimization problem has been solved based on the determination result, or updating an initial penalty parameter when determining that the self-optimization problem has not been solved based on the determination result.

6. The system according to claim 5, wherein the first entity or the second entity is a computer resource provider (CRP) and the self-optimization problem is defined by:

$$\min_{m \in S_0} \Theta_{CRP}(m, W^{ul}, W^{dl}) + \sum_{j=1}^{J} \kappa_0^{BS_j} f_j(W_j^{dl}, m_j) + \kappa_0^{mec} g(W^{ul}, m) \quad \text{[Equation 1]}$$

where $\Theta_{CRP}(m, W^{ul}, W^{dl}) = \sum_{j=1}^{J} \sum_{u \in \mathcal{U}_j} t_u^{ul} + t_u^p + t_u^{dl}$, $$f_j(W_j^{dl}, m_j) = \frac{\sum_{u \in \mathcal{U}_j} \frac{m_u \hat{m}}{c_u}}{\sum_{u \in \mathcal{U}_j} \frac{\omega_u^{dl} \gamma_u^{dl}}{o_u}},$$

$g(W^{ul}, m) =$ $$\frac{\sum_{j=1}^{J} \sum_{u \in \mathcal{U}_j} \frac{\omega_u^{ul} \gamma_u^{ul}}{b_u}}{\sum_{j=1}^{J} \sum_{u \in \mathcal{U}_j} \frac{m_u \hat{m}}{c_u}} - 1 + \epsilon \text{ and } S_0 = \left\{ m \, \middle| \, \sum_{j=1}^{J} \sum_{u \in \mathcal{U}_j} m_u \le 1 \right\}$$

$$t_u^{ul} = \frac{b_u}{\omega_u^{ul} \gamma_u^{ul} [1 - v_u]} \text{ where } v_u = \frac{\lambda_u b_u}{\omega_u^{ul} \gamma_u^{ul}}$$

$$t_u^p = \frac{c_u}{m_u \hat{m}[1-\psi]} \text{ where } \psi = \frac{\sum_{j=1}^{J} \sum_{u \in \mathcal{U}_j} \frac{\omega_u^{ul} \gamma_u^{ul}}{b_u}}{\sum_{j=1}^{J} \sum_{u \in \mathcal{U}_j} \frac{m_u \hat{m}}{c_u}}$$

$$t_u^p = \frac{o_u}{\omega_u^{dl} \gamma_u^{dl}[1-\rho_j]} \text{ where } \rho_j = \frac{\sum_{u \in \mathcal{U}_j} \frac{m_u \hat{m}}{c_u}}{\sum_{u \in \mathcal{U}_j} \frac{\omega_u^{dl} \gamma_u^{dl}}{o_u}}.$$

7. The system according to claim 5, wherein the first entity or the second entity is a mobile network operator (MNO) and the self-optimization problem is defined by:

$$\min_{w_j^{ul}, w_j^{dl} \in S_j} \Theta_{MNO_j}(m, W^{ul}, W_j^{dl}) + \kappa_j^{BS_j} f_j(W_j^{dl}, m_j) + \kappa_j^{mec} g(W^{ul}, m) \quad \text{[Equation 2]}$$

$$\text{where } \Theta_{BS_j} = \sum_{u \in \mathcal{U}_j} t_u^{ul} + t_u^p + t_u^{dl} \text{ and}$$

$$S_j = \left\{ (W_j^{ul}, W_j^{dl}) \,\Big|\, \sum_{u \in \mathcal{U}_j} \omega_u^{ul} \le 1, \right.$$

$$\left. \sum_{u \in \mathcal{U}_j} \omega_u^{dl} \le 1, W_j^{ul} \ge \left[ \frac{\lambda_u b_u}{\gamma_u^{ul}(1-\epsilon)} \right]_{u \in \mathcal{U}_j}^T \right\}$$

$$t_u^{ul} = \frac{b_u}{\omega_u^{ul} \gamma_u^{ul}[1-\upsilon_u]} \text{ where } \upsilon_u = \frac{\lambda_u b_u}{\omega_u^{ul} \gamma_u^{ul}}$$

$$t_u^p = \frac{c_u}{m_u \hat{m}[1-\psi]} \text{ where } \psi = \frac{\sum_{j=1}^{J} \sum_{u \in \mathcal{U}_j} \frac{\omega_u^{ul} \gamma_u^{ul}}{b_u}}{\sum_{j=1}^{J} \sum_{u \in \mathcal{U}_j} \frac{m_u \hat{m}}{c_u}}$$

$$t_u^p = \frac{o_u}{\omega_u^{dl} \gamma_u^{dl}[1-\rho_j]} \text{ where } \rho_j = \frac{\sum_{u \in \mathcal{U}_j} \frac{m_u \hat{m}}{c_u}}{\sum_{u \in \mathcal{U}_j} \frac{\omega_u^{dl} \gamma_u^{dl}}{o_u}}.$$

* * * * *